United States Patent [19]

De Paoli

[11] Patent Number: 5,132,162
[45] Date of Patent: Jul. 21, 1992

[54] HEATED GLAZING

[75] Inventor: Martial De Paoli, Les Bordes, France

[73] Assignee: Saint-Gobain Vitrage International, Courbevoie, France

[21] Appl. No.: 631,940

[22] Filed: Dec. 21, 1990

[30] Foreign Application Priority Data

Dec. 21, 1989 [FR] France .................... 89 16965

[51] Int. Cl.⁵ .................................................. B32B 9/00
[52] U.S. Cl. ...................................... 428/192; 428/426; 428/433; 296/84.1
[58] Field of Search ............. 296/84.1; 428/426, 433, 428/192

[56] References Cited

U.S. PATENT DOCUMENTS

| | | | |
|---|---|---|---|
| 2,650,976 | 9/1953 | Gaiser et al. | 201/73 |
| 3,081,205 | 3/1963 | Shorr | 428/38 |
| 4,073,986 | 2/1978 | Keslar et al. | 428/38 |

FOREIGN PATENT DOCUMENTS 1398776 4/1965 France .
2310979 5/1976 France .

Primary Examiner—Patrick J. Ryan
Assistant Examiner—Cathy Lee
Attorney, Agent, or Firm—Oblon, Spivak, McClelland, Maier & Neustadt

[57] ABSTRACT

A heated glazing suitable for an aircraft window including, two or more rigid sheets of glass and a network of fine metal resistance wires. Power lead-in strips providing power to the metal resistance wires are separated from one of the rigid glass sheets by a layer of polytetrafluoroethylene (Teflon) or a similar material which allows relative sliding between the power lead-in strips and the rigid glass sheet.

16 Claims, 2 Drawing Sheets

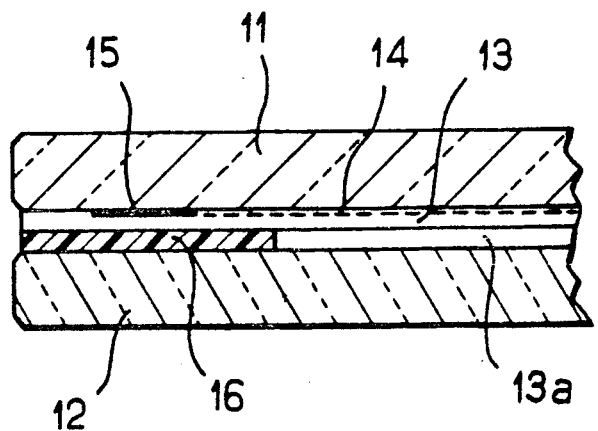
FIG_3
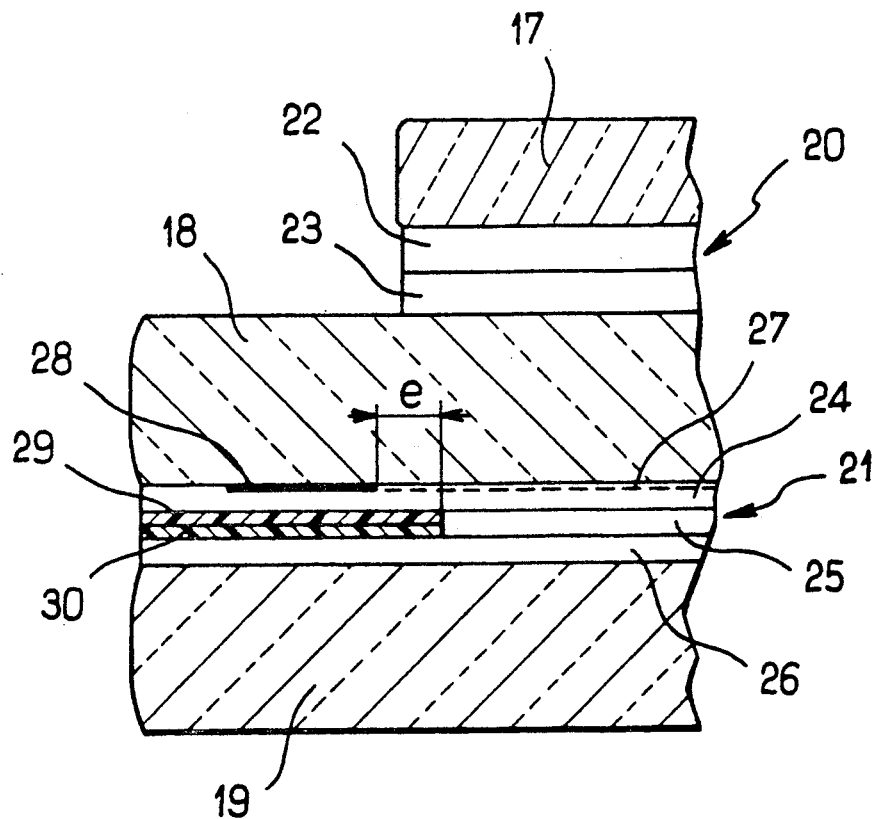
FIG_4

HEATED GLAZING

BACKGROUND OF THE INVENTION

1. Field of the Invention

This invention relates to a laminated heated glazing comprising at least two rigid sheets, in particular of glass, and at least one interlayer carrying a heating network of fine wires of electrical resistance.

2. Background of the Related Art

It is known to use heated glazings of the type described above to equip vehicles for air, maritime, and land transport. These glazings are used in particular as windshields or side windows of aircraft cockpits and as windshields of boats and trains. These glazings comprise a network formed by fine metal wires placed in parallel between two power lead-in strips (or collectors) connected to an electric voltage source outside the glazing. These conductors placed in rectilinear directrices are most often undulated or curled along these rectilinear directrices to distribute the dissipation of the heat better, to reduce the extent of the phenomena of optical diffraction created by the presence of the network, such as to increase the length of wire for a given distance between collectors.

When the heated glazing is used as aircraft glazing, for example, it is subjected under the conditions of use to significant stresses due to the differences of pressure and temperature between the two faces of the glazing, i.e. the face oriented toward the inside of the cockpit and the face oriented toward the outside. These stresses create shearing forces causing a relative displacement of the various elements constituting the laminated structure and thereby, in particular, a displacement of the interlayer (or interlayers), causing a relative displacement of the power lead-in strips relative to the wires able to go so far as to cause the breaking of resistance wires.

The breaking of resistance wires then disturbs the temperature regulation of the glazing and causes localized overheating which also accentuates the degradation of the glazing.

To mitigate this drawback, it has been proposed to give more flexibility to the resistance wires by forming a network called "returned" as described, for example, in French patent publication 1 398 776.

In this structure, with returned network, the heating network is placed on the interlayer, and directly on the glass sheet constituting the outside element of the heated glazing while the two power lead-in strips are placed on the side of the interlayer opposite the side carrying the resistant wires, the end of these wires being bent 180° to come into contact with the power lead-in strips.

The network called returned imparts to the resistance wires a flexibility which increases its resistance to the mechanical stresses resulting from the temperature differences and the pressure difference between the faces of the glazing.

This solution is generally satisfactory when the heating network is in contact with the outside glass sheet. On the other hand, this solution is not entirely satisfactory when the heating network is in contact with a rigid sheet, in particular of glass, inside the structure, and breaks of the resistance wires are then observed.

According to publication FR-A-2 310 979, a heated glazing also is known in which the heating resistance consists of a continuous electroconductive coating on which two collectors are glued. To avoid the delamination of glass plates when cold due to the expansion differences between the rigid glass sheets and the polyvinyl butyral (PVB) interlayer, a polyurethane sheet is placed between the rigid outside sheet and the PVB interlayer, and a separating frame between the PVB interlayer and the inside glass sheet.

The problem of the breaking of fine wires of electrical resistance is not dealt with in this document.

If this breaking problem of the wires is partially due to the expansion differences between the elements of the laminated glazing as is the case for the delamination of glass sheets when cold, it is mainly due to the pressure differences being exerted on the faces of the glazing, particularly in the case of an aircraft glazing. When such a glazing is at a high altitude, these differences in pressure cause a bending of the glazing.

SUMMARY OF THE INVENTION

Accordingly, it is an object of the present invention to overcome the drawbacks of the prior art and provide a novel heated glazing structure with fine metal wires of electrical resistance.

The heated glazing according to the invention comprises at least two rigid sheets, in particular glass sheets, at least one flexible interlayer, this interlayer carrying on one face a network of fine metal wires of electrical resistance placed between two power lead-in strips, the interlayer having on its other face a sliding zone at least opposite the power lead-in strips. The sliding zone permits sliding of the lead-in strips relative to an underlying layer.

The sliding zones provided at least opposite the power lead-in strips make possible a disengaging of the interlayer carrying the power strips from the underlaying layer, so that a relative displacement of the underlying layer does not cause an equivalent displacement of the power lead-in strips relative to the rigid sheet which faces them and relative to the resistance wires. The sliding zones thereby avoid a breaking of these resistance wires.

The sliding zone can be obtained by a suitable treatment of the interlayer in the desired location or more advantageously by placing a sliding element or material in this location.

According to a first embodiment of the heated glazing according to the invention, the heated glazing comprises, between two rigid sheets, at least two flexible interlayers, one interlayer carrying on its face, in contact with a rigid sheet, a network of resistance wires and the power lead-ins, and an underlying interlayer, from which at least the parts opposite the power lead-ins have been eliminated and replaced by a sliding material or element, thus making possible the sliding in these locations of the interlayer carrying the heating network, relative to the underlying interlayer. In this embodiment, the sliding zone corresponds to the zone where the sliding material has been substituted for the underlying interlayer. The sliding material therefore has a thickness equal to that of the interlayer that it partly replaces. The sliding material can be formed by at least one strip of polytetrafluoroethylene or a similar material, as available under the trademark Teflon, for example.

In an advantageous construction of the invention, the sliding material is formed by at least two superposed strips of Teflon or a similar material, the total thickness of the strips being equal to the thickness of the flexible interlayer lacking in this location.

According to another embodiment of the glazing according to the invention, the glazing comprises three flexible interlayers superposed between two rigid sheets, a first interlayer in contact with a rigid sheet and carrying the heating network and the power lead-ins on its contact face, a second interlayer underlying the first interlayer, the second interlayer having parts at which the power lead-ins have been replaced by the sliding material, and a third interlayer underlying the second interlayer, the third interlayer being in contact with the second rigid sheet.

As described above, the sliding material can be of Teflon or a similar material and advantageously consists of at least two superposed Teflon strips.

In the heated glazing according to the invention, the width of the sliding material, in particular Teflon strips, is preferably larger than the width of the power lead-ins. Generally, the sliding strips are flush with an edge of the glazing and they project into the interior of the glazing beyond the power lead-ins by at least about 5 millimeters.

As described above, the sliding zone, advantageously the Teflon strips, extends at least under the entire length of the power lead-in strips. This zone can extend according to a characteristic of the glazing according to the invention, over the entire circumference of the glazing, in particular when the ends of the lead-in strips are close to one another.

The rigid sheets entering into the composition of the glazing according to the invention can be glass sheets tempered thermally, chemically or not tempered. They can also be sheets of rigid plastic such as polycarbonate, polymethyl methacrylate or a glass-rigid plastic combination.

The interlayer carrying the network of metal heating wires can be a thermoplastic material, for example, polyvinyl butyral or polyurethane.

Generally, the glazing according to the invention comprises, as already described above, several interlayers superposed between two rigid sheets. These different layers can be of the same thermoplastic material or have a base of different thermoplastic material.

Also, the glazing according to the invention can exhibit both polyvinyl butyral layers and polyurethane layers and in variable arrangements.

The heated glazing according to the invention can exhibit two, three, or more, rigid sheets between which one or more interlayers are placed each time.

The heated glazing can also exhibit a structure with an offset edge to be able to be mounted in a known way, flush with the body or the cockpit.

Under one of the aspects of the invention, the relative displacement of the power lead-in strips can also be reduced relative to the resistance wires, by avoiding the displacement of the power lead-ins relative to the adjacent rigid sheet, for example, by making these power lead-ins adhesive to the rigid sheet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a variant of the glazing according to the invention.

FIG. 4 shows another variant of the glazing according to the invention, able to be used as an aircraft cockpit glazing.

DETAILED DESCRIPTION OF THE PREFERRED EMBODIMENTS

Figure 1:
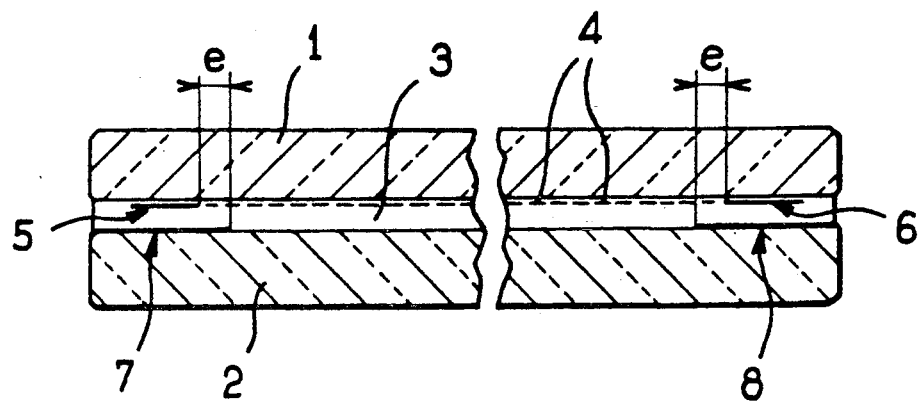
FIG. 1 diagrammatically shows, in section, a structure of a heated glazing.
Figure 2:
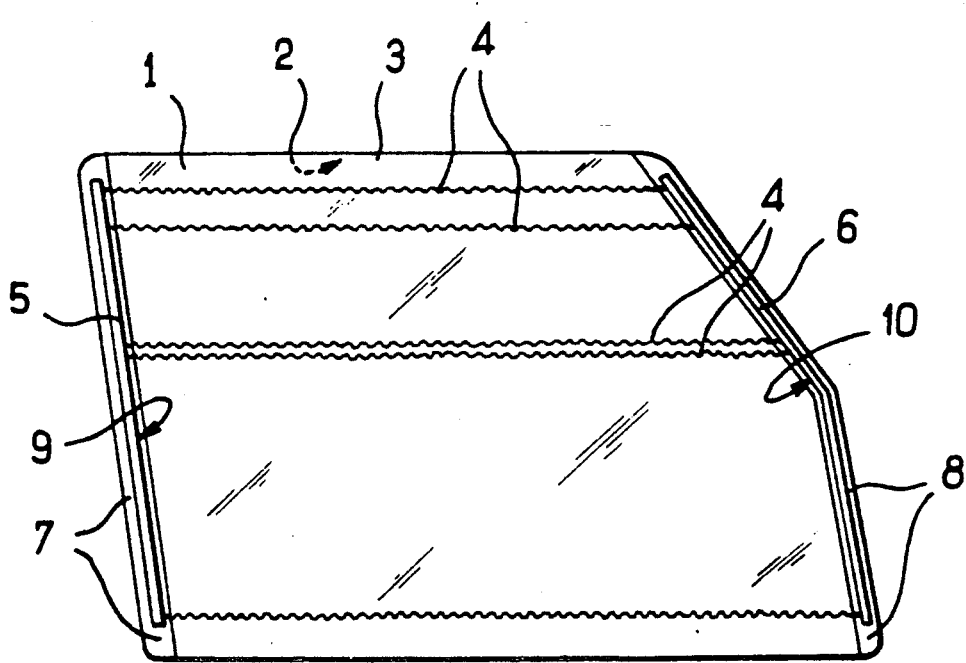
FIG. 2 shows the glazing of FIG. 1, in a plan view.

Referring now to the drawings, wherein like reference numerals designate identical or corresponding parts throughout the several views, and more particularly to FIGS. 1 and 2 thereof, a first embodiment of the heated glazing includes two glass sheets 1 and 2 and an interlayer 3, of a thermoplastic material, such as polyvinyl butyral, for example. The interlayer 3 carries a heating network formed by fine metal wires 4 undulated around generatrices extending between two power lead-in strips 5 and 6. Only some of the wires 4 are shown in FIG. 2.

Wires of tungsten, ferronickel or copper, whose diameters can vary between 10 and 30 microns, for example, can be used. Power lead-in strips 5, 6 are metal strips. Wires 4 are soldered to these metal strips. Each power lead-in can be formed by two superposed metal strips sandwiching the ends of wires 4.

The face of the interlayer opposite that which carries the heating network and the power lead-ins exhibits sliding zones 7 and 8 along which the interlayers can slide relative to second rigid sheet 2. These sliding zones project in length and in width beyond the power lead-ins and extend over a length corresponding to the length of the lateral sides of the glazing and over a width which goes from the edge of the glazing to beyond inside edge 9, 10 of the power lead-in strips. A distance e between the alignment of the inside edge of the power lead-in and the inside edge of the sliding zone is preferably greater than 6 mm. In sliding zones 7 and 8, interlayer 3 can slide over glass sheet 2 when the glazing is placed under conditions of temperature and excess pressure being exerted on the side of sheet 2, so that the glazing is deflected toward the outside and creates stresses causing a shearing of the constituent elements of the laminated structure and in particular of interlayer 3, relative to glass sheet 2.

A glazing not provided with these sliding zones and subjected to a significant excess pressure on the side of sheet 2 of the glazing is, as described above, deflected toward the outside and the peripheral part of the interlayer facing sheet 2 subjected to the forces oriented toward the periphery of the glazing which tend to displace the power lead-ins relative to sheet 1 and to resistance wires 4.

In the glazing according to the invention, by being disengaged from sheet 2, the parts corresponding to the sliding zones of the interlayer slide over glass sheet 2, so that the relative displacement of the power lead-ins relative to sheet 1 and to resistance wires 4 is greatly reduced. A very diminished risk of breaking of resistance wires follows.

FIG. 3 shows in section a side of a variant of a glazing according to the invention, which comprises two rigid sheets 11, 12, of glass tempered chemically, and two superposed interlayers 13, 13a of polyvinyl butyral, for example. This glazing can be used in an arrangement in which sheet 11 is oriented toward the outside as well as in a reversed arrangement, this sheet 11 then being oriented toward the inside. Interlayer 13 carries the heating network of wires 14 and power lead-in strips 15. Underlying interlayer 13a exhibits small dimensions relative to interlayer 13, the missing part which is opposite lead-in strip 15 on a zone at least as long as the lead-in strip and wider than this lead-in strip 15, is replaced by a strip of a sliding material, for example, a Teflon strip 16 of the same thickness as interlayer 13a.

When the heated glazing is subjected to excess pressure stresses or, on the contrary, partial vacuum between its two faces, these stresses being increased if necessary by stresses linked to the temperature differences between the two faces, the Teflon strip disengages the interlayer from the glass sheet, at the level of the power lead-ins, from two sides of the glazing, so that a displacement of glass sheet 12 does not cause an equivalent displacement of lead-in strip 15. A great reduction of the relative displacement of the power lead-ins follows relative to the resistance wires and there again, a very reduced risk of breaking relative to a glazing not equipped with sliding strips.

FIG. 4 shows another embodiment of the heated glazing according to the invention.

The heated glazing is formed here by three rigid sheets 17, 18, 19 of glass tempered chemically and two interlayers 20, 21.

Glass sheet 17 is oriented toward the outside when the glazing is in mounted position in an aircraft cockpit as well as interlayer 20 which is formed here by two layers 22, 23 of thermoplastic material, for example two layers of polyurethane or two layers of polyvinyl butyral or else one polyurethane layer 22 and one polyvinyl butyral layer 23, are set back relative to the other elements of the glazing to make possible a flush mounting relative to the structure of the cockpit.

Second glass sheet 18 is separated from third sheet 19 intended to be oriented toward the inside of the cockpit by an interlayer 21 formed here by 3 layers 24, 25, 26 each with about a 0.5 mm thickness, of polyvinyl butyral, for example. Interlayer 24 carries on its face in contact with second glass sheet 18 the heating network of fine metal wires 27 and power lead-ins 28.

Interlayer 25 exhibits small dimensions relative to interlayer 24 carrying the heating network, the missing parts located opposite power lead-ins 28 being replaced on each side of the glazing by two superposed strips 29, 30 of Teflon or an equivalent material. The thickness of the two superposed Teflon strips 29, 30 is equal to the thickness of interlayer 25. The Teflon strips which extend over at least the entire length of power lead-ins 28 extend in a width direction from the edge of the glazing toward the center of the glazing to about 8 mm (e) beyond the inside edge of power lead-in strips 28.

Third interlayer 26 exhibits the same dimensions as that which carries the heating network.

Under the conditions of use of the glazing, as described above, the presence of the Teflon sliding zones at least opposite the power lead-in strips prevents a relative displacement of lead-in strips relative to the resistance wire.

To evaluate the improvement of the heated glazing according to the invention, relative to a heated glazing which does not use sliding strips, the glazings are subjected to a fatigue test. This test consists of subjecting the glazings to 100,000 cycles, each cycle of a duration of one minute consisting of producing an excess pressure of 625 mbars on the face intended to be oriented toward the inside of the cockpit at a regulation temperature of the heating network of 40°.

The tested glazings are those described in relation to FIG. 4. They exhibit 190 wire bundles.

The heating surface, which remains active after a given number of cycles, is determined.

At the end of 4,000 cycles, the heating surface of 100% at the outset has fallen to 60% for a reference glazing and is equal to 99% for the glazing according to the invention.

At the end of 50,000 cycles, the heating surface has fallen to 55% for the reference glazing and is 97% for the glazing according to the invention.

At the end of 100,000 cycles, the heating surface has fallen to 50% for the reference glazing, and it is still 95% for the glazing according to the invention.

The heated glazing according to the invention can be used advantageously as aircraft glazing as described above, but it can also equip maritime or land vehicles.

What is claimed is:

1. A heated glazing comprising:
   first and second rigid glass sheets;
   a flexible interlayer sandwiched between said first and second rigid glass sheets;
   a pair of power lead-in strips mounted at an interface between said first rigid glass sheet and said flexible interlayer;
   a network of fine metal wires of electrical resistance extending between said pair of power lead-in strips; and
   a sliding zone formed opposite said power lead-in strips, said sliding zone permitting relative sliding movement between said power lead-in strips and said second rigid glass sheet,
   wherein the sliding zone projects into the interior of the glazing at least 5 mm beyond an inside edge of the power lead-in strips.

2. A heated glazing according to claim 1, wherein said flexible interlayer comprises first and second flexible interlayer portions, said first interlayer portion carrying said power lead-strips on a first face thereof and said second interlayer portion underlying the first interlayer portion and including a sliding material in a region opposite said power lead-in strips.

3. A heated glazing according to claim 1, wherein said flexible interlayer comprises first, second, and third interlayer portions, said first interlayer portion carrying said power lead-in strips on a first face thereof, said second interlayer portion including a sliding material in a region at least opposite said power lead-in strips, and said third interlayer underlying the second interlayer portion and being in contact with said second rigid glass sheet.

4. A heated glazing according to claim 2, wherein the sliding material is of a thickness equal to the thickness of the second interlayer portion.

5. A heated glazing according to claim 3, wherein the sliding material comprises at least two superposed strips whose combined thicknesses total to the thickness of the second interlayer portion.

6. A glazing according to claim 1, wherein the glazing has an outer lateral edge and the sliding zone has a lateral edge flush with the outer lateral edge of the glazing.

7. A glazing according to claim 6, wherein the glazing has a circumference and the sliding zone extends around the entire circumference of the glazing.

8. A glazing according to claim 1, wherein the interlayer includes a thermoplastic layer of polyvinyl butyral.

9. A glazing according to claim 1, wherein the interlayer includes a thermoplastic layer of polyurethane.

10. A glazing according to claim 1, wherein the interlayer includes a layer of polyvinyl butyral and a layer of polyurethane.

11. A glazing according to claim 1, wherein the sliding material is polytetrafluoroethylene.

12. A glazing according to claim 1, further comprising a third rigid glass sheet, said third rigid glass sheet being adjacent to said first rigid glass sheet.

13. A glazing according to claim 12, wherein said third rigid glass sheet has an edge offset from an edge of said first rigid glass sheet.

14. A glazing according to claim 1, wherein the power lead-in strips are adhered to the first rigid glass sheet.

15. A glazing according to claim 1, wherein the glazing is an aircraft glazing.

16. A heated glazing comprising:
first and second rigid glass sheets;
a flexible interlayer sandwiched between said first and second rigid glass sheets;
a pair of power lead-in strips mounted at an interface between said first rigid glass sheet and said flexible interlayer;
a network of fine metal wires of electrical resistance extending between said pair of power lead-in strips; and
a sliding zone formed opposite said power lead-in strips, said sliding zone permitting relative sliding movement between said power lead-in strips and said second rigid glass sheets;
wherein:
said flexible interlayer comprises first and second flexible interlayer portions, said first interlayer portion carrying said power lead-in strips on a first face thereof and said second interlayer portion underlying the first interlayer portion and including a sliding material in a region opposite said power lead-in strips; and
the sliding material comprises at least two superposed strips whose combined thicknesses total to the thickness of the second interlayer portion.

* * * * *